United States Patent [19]
Merino et al.

[11] 3,712,541
[45] Jan. 23, 1973

[54] TROUGH-SHAPED TOY VEHICLE TRACK

[75] Inventors: Dennis H. Merino, Harbor City; Floyd E. Schlau, Palos Verdes Estates, both of Calif.

[73] Assignee: Mattel, Inc., Hawthorne, Calif.

[22] Filed: Aug. 20, 1970

[21] Appl. No.: 65,370

[52] U.S. Cl. .................... 238/10 E, 46/1 K, 273/86 R
[51] Int. Cl. .............................................. A63h 19/30
[58] Field of Search...238/10 E, 10 F; 104/60; 46/26, 46/202, 1 K; 273/86, 86 R; 272/4

[56] References Cited

UNITED STATES PATENTS

| | | | |
|---|---|---|---|
| 2,862,333 | 12/1958 | Gardiol | 238/10 E |
| 3,445,063 | 5/1969 | Ferentinos | 238/10 F |

FOREIGN PATENTS OR APPLICATIONS

| | | | |
|---|---|---|---|
| 650,878 | 10/1937 | Germany | 238/10 R |

Primary Examiner—Drayton E. Hoffman
Assistant Examiner—Richard A. Bertsch
Attorney—Seymour A. Scholnick

[57] ABSTRACT

A track for use with self-powered or coasting-type toy vehicles which allows passing of slower vehicles by faster ones by encouraging the vehicles to wander gradually from one side of the track to the other. The track is concave, with a radius of curvature greater than its width to encourage vehicle wandering, but less than five times its width to reduce the likelihood of vehicles crashing into the side walls of the track. The side walls meet the gently curving portion in a radius of curvature which is more than one-fiftieth the width of the track to turn vehicles back towards the center of the track with a minimum of scraping.

2 Claims, 5 Drawing Figures

PATENTED JAN 23 1973
3,712,541
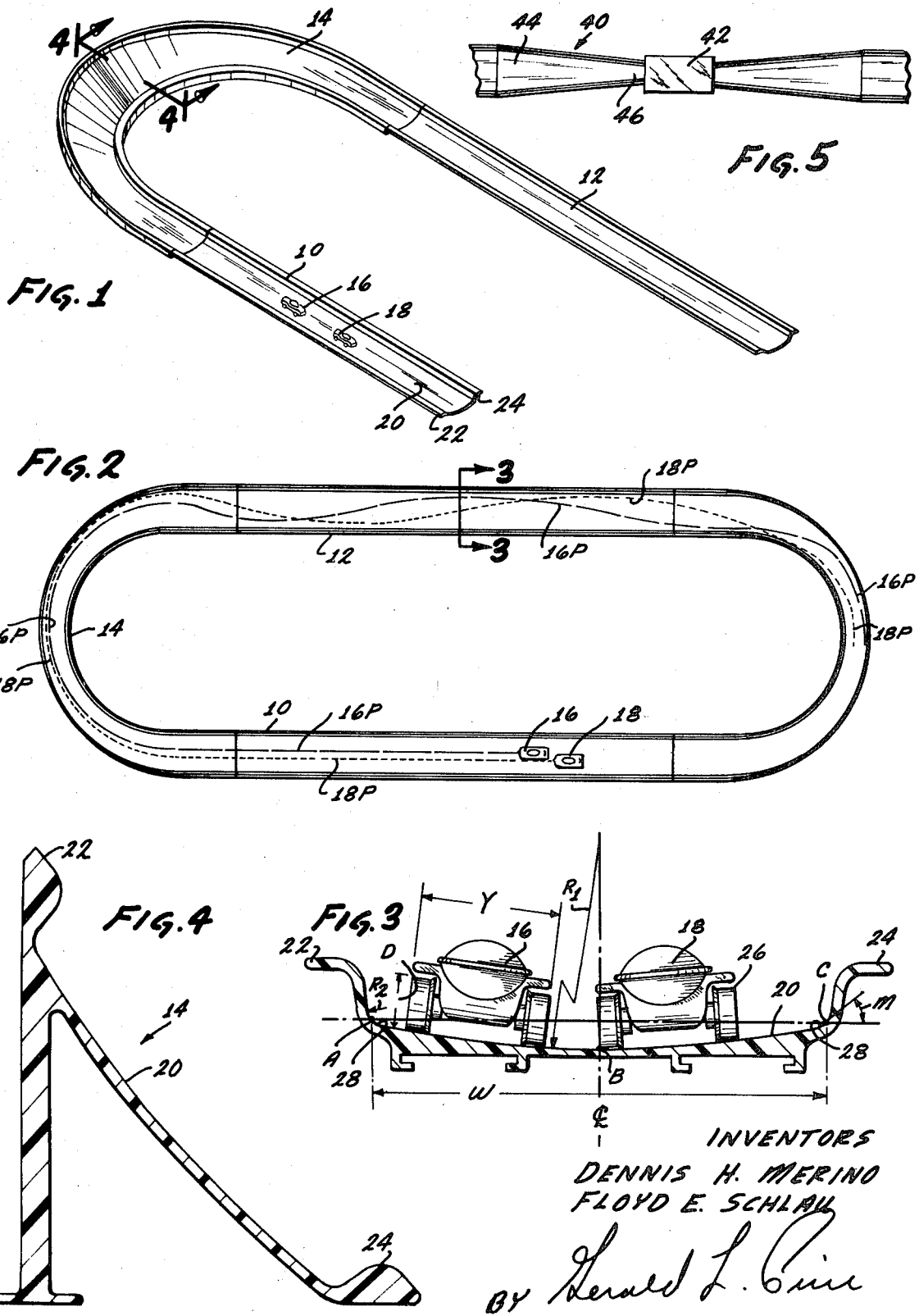
INVENTORS
DENNIS H. MERINO
FLOYD E. SCHLAU
BY Gerald L. Price
ATTORNEY

TROUGH-SHAPED TOY VEHICLE TRACK

BACKGROUND OF THE INVENTION

1. Field of the Invention

This invention relates to toy vehicles, and more particularly, to a track for use with such vehicles.

2. Description of the Prior Art

Toy vehicles that are free from electrical or other connections to a track can engage in races along the track wherein they pass one another by changing lanes, in the same manner as actual racing drivers pass one another. If a wide track is used which is smooth and flat, the vehicles can readily change lanes, but they have a tendency to hit the side rails at a great enough angle to cause spin-outs or great slowing. A track which was wide enough to allow vehicles to pass one another, and which allowed vehicles to wander from one side to the other to encourage passing, yet which reduced the tendency of vehicles to crash into the side rails of the track, could provide highly entertaining races between vehicles.

OBJECTS AND SUMMARY OF THE INVENTION

An object of the present invention is to provide a track for toy vehicles which allows passing while reducing the tendency of vehicles to crash into the side rails.

Another object of the present invention is to provide a track and vehicle set which can be used to conduct highly entertaining races.

In accordance with one embodiment of the present invention, a track for toy vehicles is provided which encourages the vehicles to wander from one side of the track to the other to allow passing, but which limits wandering to generally prevent vehicles from crashing into or scraping hard against the side rails of the track. The track has a vehicle-supporting surface which is concavely curved, the curve being gentle across most of the width and much sharper at either side near the side rails. The track is generally used in a layout which includes curved sections wherein higher speed vehicles tend to ride along the outside of the curve, so that thereafter on straightaways, they gently wander from side of the track to the other. The wandering causes vehicles to keep changing lane position so that faster vehicles are often able to overtake slower ones. The radius of curvature along most of the track width is in-between a length equal to the width of the track and five times the width, to allow for limited wandering. The curvature at either side of the track is greater than one-fourtieth the width of the track to turn wandering vehicles away from the side walls with a minimum of scraping.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial perspective view of a track layout utilizing track sections constructed in accordance with the invention;

FIG. 2 is a plan view of a complete track layout which is partially shown in FIG. 1, typical paths of two vehicles thereon being indicated;

FIG. 3 is a sectional view of a straightaway portion of track taken on the line 3—3 of FIG. 2, and showing a pair of vehicles on the track;

FIG. 4 is a sectional view of a curved track section taken on the line 4—4 of FIG. 1; and FIG. 5 is a plan view of an accelerating device which can be used in the track layout of FIG. 2.

DESCRIPTION OF THE PREFERRED EMBODIMENTS

FIG. 1 illustrates a track constructed in accordance with the invention, which includes straight track sections 10, 12 and a curved section 14, the sections being part of a complete track layout, such as the simple loop of FIG. 2. The track is wide enough to carry at least two vehicles 16, 18 side-by-side, so they can pass one another. Either unpowered vehicles can be used which are given a boost of speed by an accelerating device positioned along the layout, or self-propelled cars can be used such as the type which carry a rechargeable battery and electric motor. The track has a vehicle-supporting surface 20 which allows the vehicles to wander from one side of the track to the other so that a pair of vehicles will often be in position for the faster one to pass the slower one. However, the wandering is controlled to an extent that minimizes the passibility of a vehicle hitting the side rails 22, 24 at a great enough angle to cause it to spin out of control or fly over the rail.

As shown in FIG. 3, the vehicle-supporting surface 20 has a width W about four times as great as the width Y of the vehicle, to provide considerable room for passing. Typically, the width Y of a vehicle is about 1 inch, so that the track width W is about 4 inches. Along this width, the vehicle-supporting surface 20 has a radius of curvature $R_1$ of about 8 inches. This curvature is generally sufficient to allow vehicles to slowly wander from one side of the track to the other, but is small enough to redirect vehicles back to the center before they reach the sides of the track.

In many cases, a vehicle will wander at a great enough angle from a straight-ahead direction that it could wander further than the limits of the gently curved portion of the track if not firmly restrained. Of course, the side rails 22, 24 could be positioned so that a vehicle which wandered too far would suddenly encounter the side walls or rails and be turned back. However, this would result in substantial scraping of the outer surfaces of the wheels 26 on the side rails, which would substantially slow the vehicle's motion. Such slowing is especially undesirable in the case of coasting-type vehicles which are accelerated at only one position along the layout, since several of such slowings can prevent the vehicle from completely tranversing the layout. Such slowing is also undesirable in the case of self-powered vehicles. To reduce such scraping, a transition region 28 is provided between the gently curving region and the side rails 22, 24, where the track has a radius of curvature $R_2$ which is small but not too small. A radius of curvature such as one-fourth inch for typical vehicles of a width Y of one inch and wheels of a diameter D of about three-eighths inch, is large enough to prevent substantial scraping. Instead of producing scraping, this curvature provides a high banking that diverts the vehicle back towards the center of the track without the shock of suddenly hitting a rail. The radius $R_2$ should be greater than about one-tenth inch, or in other words, more than about one-fortieth the width of the track.

FIG. 2 indicates the paths of the two vehicles 16, 18 which are of the self-powered type, and which are initially started at the locations shown in FIG. 2. If both vehicles are initially directed straight along the track, they will tend to move straight along the center of the track until they reach the curved track section 14. If both vehicles are traveling fast, they will tend to ride up the track and move near the outer edge of the curve. When the vehicles enter the next straightaway at 12, they will drop from the outer edge of the track and thereafter begin wandering slowly from one side to the other. The precise angle of wandering will be determined in a random fashion, and the paths of the two vehicles will thereafter often by spaced laterally at a great enough distance for a faster vehicle to pass a slower one. The gentle wandering from one side to the other will continue throughout the rest of the vehicle paths. Even if one vehicle is blocking the path of a faster one, there will be some lateral forces produced which will tend to increase the wandering tendencies of the vehicles to increase the chance that the faster one will catch up with the slower one when they are in widely spaced lane positions.

A variety of different curvatures have been investigated to determine a proper curvature for providing the required degree of wandering. At one extreme, a track which was part of a cylinder was tried and it was found that the vehicles would stay directly in the center of the track and could not pass one another. At the other extreme, flat tracks allow passing, but there is a high frequency of vehicles crashing into the side rails hard enough to spin out of control. For vehicles of a width of about one inch, which move on a track of about four inches width, a radius $R_1$ between about 4 and 20 inches provides the degree of curvature for sufficient wandering to allow passing while providing a definite bias to vehicles to urge them toward the center of the track.

As mentioned above, the radius of curvature $R_2$ immediately within the side rails 22, 24 should not be so small as to create hard scraping of the wheels against the rails. However, it should also not be too large. For example, a track section for cars of a width of about 1 inch has been constructed with a main radius $R_1$ of about 12 inches and outer radii $R_2$ of about 2 inches. This track was found to be efficient in allowing vehicles to pass one another while gently urging them to return to the center of the track. However, it was found that vehicles would often drive up the sides of the curve until they were tilted far enough to overturn and roll over. To reduce the occurrence of such roll over, a smaller radius of curvature less than about 1 inch is desirable for such vehicles.

Thus, a vehicle track with a gentle curvature at the center and relatively sharp curves at either side is desirable to encourage entering races. Such a curve is compound and even the center portion may not have a constant radius of curvature. However, the average radius of curvature across most of the vehicle track should be about 8 inches in the case of vehicles of a width of about one inch and about one-fourth inch at the sides. The average radius can be taken as the radius of a circle defined by the three points A, B and C on the vehicle-supporting surface 20. Point B is at the center of the track, and points A and C are at the sides of the track where an imaginary line L which extends across the width of the track makes an angle M of 30° with a tangent to the track. Outside of points A and C, the track side rails extend at an angle which increases to much more than 30° with line L. The surface region having the smaller radius $R_2$ is at or near the points A and C. The same shape of vehicle-supporting surface can be employed at the turns, except that the track should be banked as shown in FIG. 4.

FIG. 5 illustrates a track section 40 which includes an accelerator mechanism 42 therealong, such as a rapidly rotating belt, for accelerating unpowered vehicles along a track layout. Such a track section can be used in place of the track section 10 in FIG. 2 to adapt the apparatus for unpowered vehicles. The track section 40 narrows from one end 44 to a position 46 immediately up-path from the accelerating mechanism so that vehicles move into the accelerating mechanism in single file. With this apparatus, vehicles race along the layout with the first one to reach the accelerator gaining some advantage for the next lap around the track.

Thus, the invention provides a track which allows self-powered or unpowered vehicles to move rapidly along a track layout with a minimum occurrence of spin-outs and to engage in entertaining races wherein faster cars pass slower ones by changing lane position. This is accomplished by employing tracks which are of generally concave configuration in cross-section, with a gentle but definite concave curvature along most of the width of the track, and with a small but not sharp radius of curvature at either side of the track within the side rails. The tracks are designed for use with vehicles of approximately a predetermined width, and the track is made somewhat wider than the width of two of such vehicles to allow one to pass another. Of course, a much wider track could be used, but no special advantage is gained from using a track wider than about four times the width of the vehicles, and the added bulk and expense of such a track is generally not justified.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for use with toy vehicles having a width on the order of one inch comprising:
   a track having a concave vehicle-supporting surface with a width of at least 2 inches and a radius of curvature greater than 4 inches and less than 20 inches, said vehicle-supporting surface being free of barriers between said sides, so that toy vehicles that have a width on the order of 1 inch can wander from one side of the track to the other without obstruction, side rails extending upwardly and outwardly from the edges of said vehicle supporting surface, and a curved surface at the juncture of said vehicle supporting surface and said side rails, said curved surface having a radius of curvature of the order of one-quarter inch.

2. The apparatus described in claim 1 wherein:

said track includes a first track section containing part of said surface portion which is concavely curved, said first track section defining a banked curve; and said track includes a second track section containing part of said surface portion which is concavely curved, said second track section extending substantially straight and constructed for connection in series with said first track section.

* * * * *